United States Patent [19]
Ritz et al.

[11] 3,872,565
[45] Mar. 25, 1975

[54] REACTOR VESSEL SEAL SERVICE FIXTURE

[75] Inventors: William C. Ritz, Greensburg; Glenn E. Otterman, St. Dravosburg, both of Pa.

[73] Assignee: The United States of America as represented by the United States Atomic Energy Commission, Washington, D.C.

[22] Filed: May 9, 1974

[21] Appl. No.: 468,323

[52] U.S. Cl. ............. 29/200 P, 29/235, 29/DIG. 34
[51] Int. Cl. ....................... B23p 19/00, B23p 19/02
[58] Field of Search ......... 29/200 P, 200 J, 148.4 S, 29/DIG. 34, 400 N, 451, 235

[56] References Cited
UNITED STATES PATENTS
3,409,970   11/1968   DiPietra .......................... 29/200 J

*Primary Examiner*—Thomas H. Eager
*Attorney, Agent, or Firm*—Dean E. Carlson; Leonard Belkin

[57] ABSTRACT

Apparatus for installing a seal in the head of a reactor vessel comprising a fixture supporting the seal which automatically releases the seal when the fixture comes in contact with the head.

6 Claims, 5 Drawing Figures

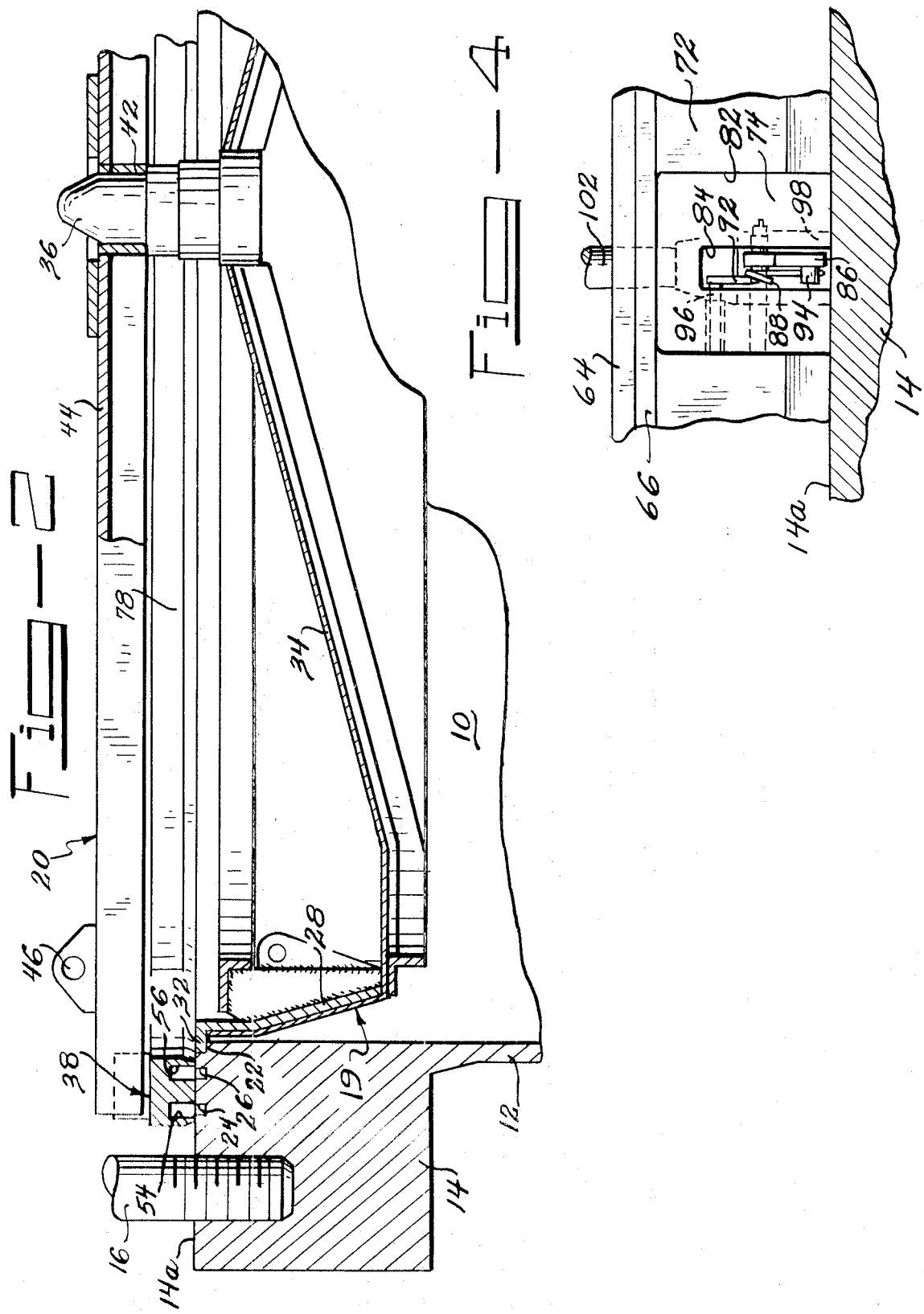

REACTOR VESSEL SEAL SERVICE FIXTURE

BACKGROUND OF THE INVENTION

The invention described herein was made in the course of, or under a contract with the U.S. Atomic Energy Commission.

One proposed design for the liquid metal fast breeder reactor (LMFBR) uses a reactor refueling scheme in which the reactor head is removed routinely. The procedure requires that the head seals be replaced at each refueling operation which is conducted remotely in a hot cell where manned access is prohibited because of the radiation level from the open reactor vessel.

Each seal itself is a metallic O-ring which must be accurately placed without being damaged by bending or squeezing. The danger of producing such damage in a ring being handled by remotely operated manipulators is a matter of some concern and proposed existing and other arrangements for accomplishing this involve elaborate and expensive mechanisms.

SUMMARY OF THE PRESENT INVENTION

The present invention makes it possible to install remotely, accurately, and with excellent protection O-rings on the flange of an open reactor vessel.

In accordance with a preferred embodiment of the invention there is provided a ring-shaped fixture to be lowered on the flange. The fixture has grooves to match grooves on the flange to accommodate seals. Typically there would be two grooves for two seals. Each groove on the fixture is provided with a plurality of pivoted finger-like elements rotatable between a first position retaining the seal and a second position not only releasing but pushing the seal out of the groove into the flange groove into which the seal is to be placed. One or more releasing plungers extending out of the fixture come into contact with the flange as the fixture and flange come together causing the finger-like elements to pivot and release the seal. In order to insure proper alignment of the fixture with the flange there is provided a vessel protection pan which drops into the open reactor vessel supported by the reactor opening. A shaft extending up from the pan is designed to receive a matching female member on the fixture thereby insuring accurate alignment.

The fixture may be supported by cables and would be lowered into place. The seals are dropped into their respective grooves in the flange accurately, automatically, and with no danger of damage.

It is thus a principal object of this invention to provide apparatus for the remote emplacement of a seal with great accuracy and reduced danger of damage to the seal.

Other objects and advantages of this invention will hereinafter become obvious from the following description of a preferred embodiment of this invention.

BRIEF DESCRIPTION OF THE DRAWINGS

FIG. 2 is an elevation view in section of the installment fixture shown in FIG. 1;

FIG. 4 is a view along 4—4 of FIG. 3a.

DESCRIPTION OF THE PREFERRED EMBODIMENTS

Figure 1:
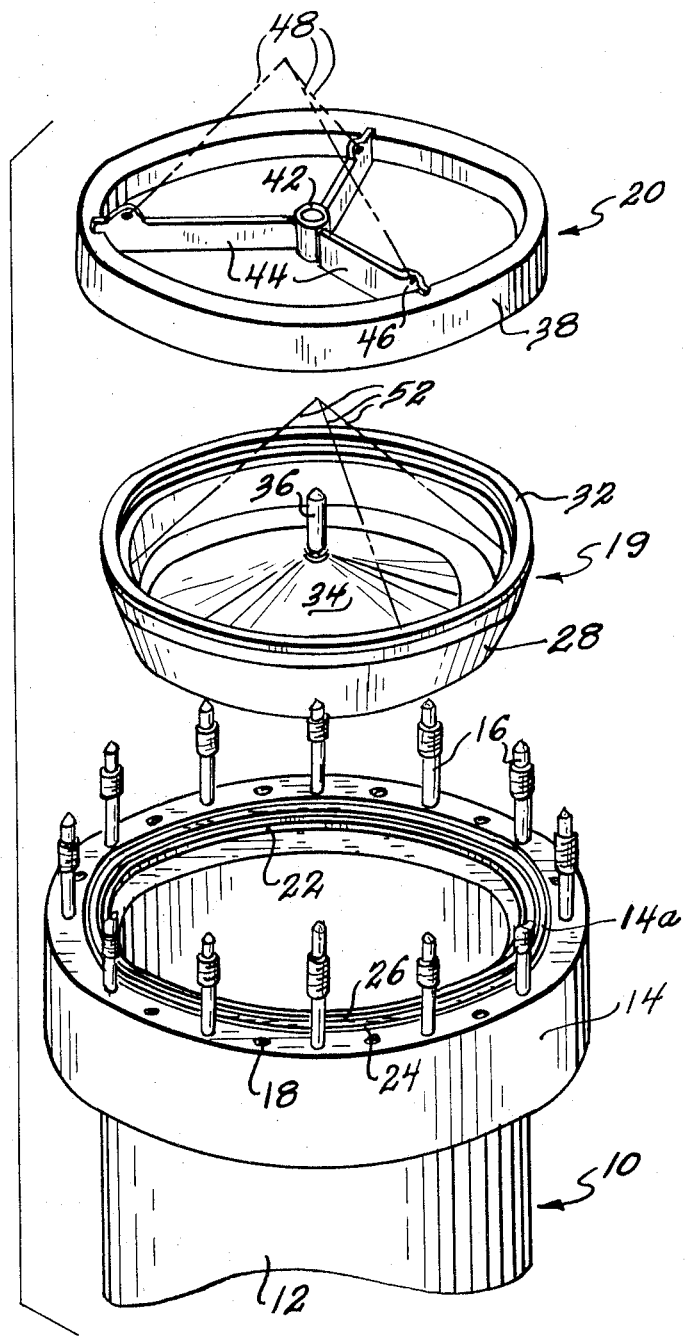
FIG. 1 is an exploded view of the major elements of a preferred embodiment of this invention.

Referring to the drawings, there is shown in FIG. 1 reactor vessel 10 with the cover removed consisting of a cylindrical section 12 having a flange 14 with a top surface 14a and exposed bolts 16 and tapped holes 18 to receive threaded bolts from the cover (not shown), a vessel protection pan 19, and a seal installation fixture 20. As shown in greater detail in FIG. 2, flange 14 is provided with an inner shoulder 22 to support vessel protection pan 19 and upper surface 14a is provided with a pair of annular grooves 24 and 26 into which O-ring seals are to be inserted in accordance with the principles of this invention.

Vessel protection pan 19 is designed to insure that during the procedure of placing seals within grooves 24 and 26 the interior of reaction vessel 10 is closed off and further as will be evident from the discussion below to insure proper alignment of the seal installation fixture 20. Pan 19 consists of a frusto-conical wall 28 having a flange 32 to rest on shoulder 22 of flange 14 for support and a conical bottom 34 whose apex supports a cylindrical post 36 which is designed to align the seal installation fixture as will be seen from the description further below. The details of the construction of pan 19 do not form a part of this invention.

Seal installation fixture 20 consists of a ring 38, a hollow cylindrical hub 42, and a plurality of spokes 44 extending from hub 42 to ring 38. The opening in hub 42 is designed to accommodate post 36 shown in FIG. 2, serving to align seal installation fixture 20 as it is lowered into place. Three hook eyes 46, one of which is illustrated in FIG. 2, permits fixture 20 be carried by cables 48. Vessel protection pan 19 is similarly supported by cables 52.

Figure 3A:
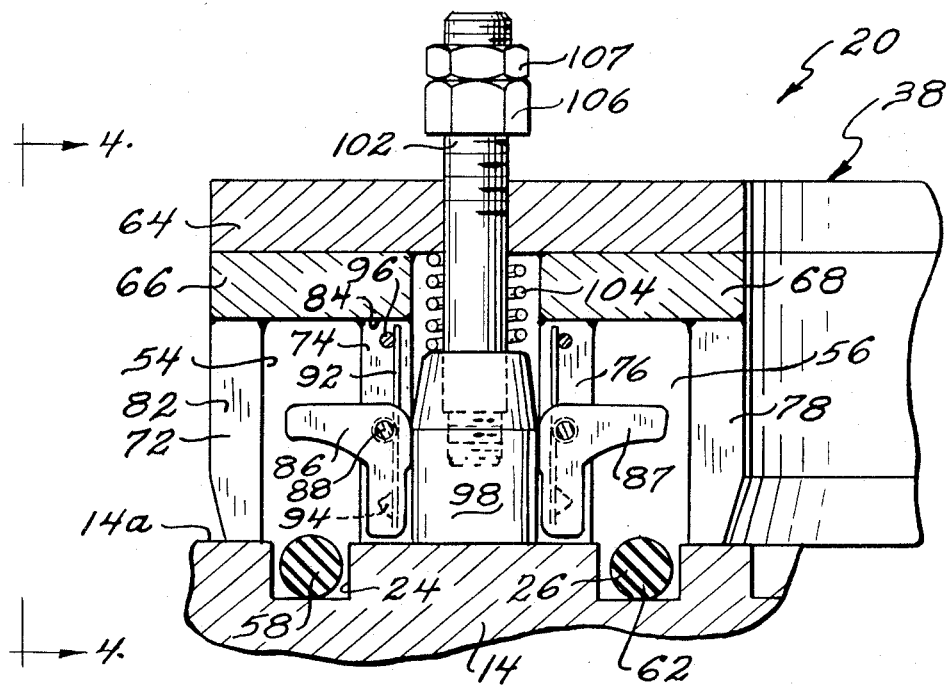
FIGS. 3a and 3b show sectional views of the receptacles for carrying the seals in the fixture in the released and trapped positions, respectively.
Figure 3B:
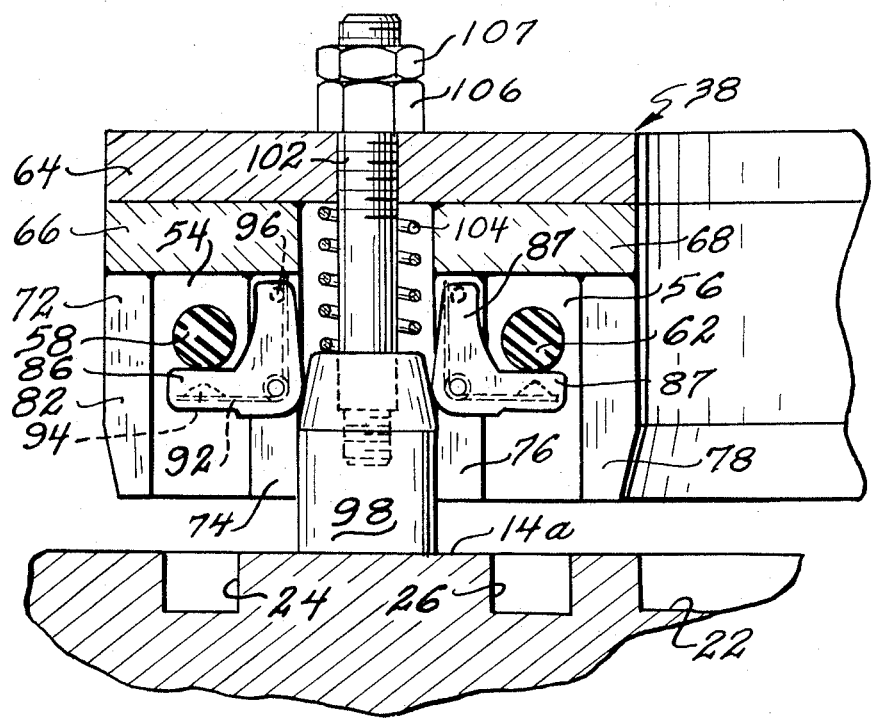

In order to carry the seals to flange 14 and emplace them properly, reference is made to FIGS. 3a, 3b and 4 where are illustrated a pair of concentric grooves 54 and 56 in installation fixture 20 to accommodate O-rings 58 and 62 as illustrated. It will be seen that ring 38 in the embodiment shown consists of an upper flat, annular member 64, a pair of concentrically arranged members 66 and 68, and concentrically arranged circular plates 72, 74, 76 and 78. From FIG. 4 it will be noted that plate 72 has an opening 82 at the location of each entrapment finger to be described below. Typically at least three entrapment fingers would be employed along the circumference of ring 38 for each metal O-ring to be installed. If elastomer O-rings are employed, then more entrapment fingers would be required. Plate 72 may be made up of segments if opening 82 is the full height of plate 72 as shown in FIG. 4. Smaller openings 84 may be employed in plate 74 to more readily accommodate means to support the entrapment fingers. In a similar fashion, plates 78 and 76 would be similarly provided with openings.

A right-angle shaped entrapment finger 86 is pivoted by a shaft 88 extending across opening 84 in plate 74. A similar finger 87 is mounted on plate 76. A spring member 92, attached at one end to a protusion 94 on finger 86 is wound once on shaft 88 and extends up to contact a pin 96, biasing finger 86 in the closed position, as shown in FIG. 3b.

A releasing plunger 98, supported by a shaft 102 and biased downwardly by spring 104, is adjacent to and between entrapment fingers 86 and 87. Stop nuts 106 and 107 limit the downward travel of plunger 98 which extends below the bottom surface of ring 38 when fully extended as shown in FIG. 3b.

Plunger 98 and fingers 86 and 87 are shaped so that when the former is fully extended down the latter are free to be biased in their closed positions, shown in FIG. 3b, by their biasing springs, such as spring 92 for finger 86. When plunger 98 is raised, such as by lowering fixture 20 on flange 14 causing contact between plunger 98 and the upper surface 14a of flange 14, fingers 86 and 87 are rotated as shown by FIG. 3a to release seals 58 and 62, the upper legs of entrapment fingers 86 and 87 directly pushing the rings out of their slots or grooves. The weight of fixture 20 is sufficient to overcome the bias of all the springs 104 employed and also to overcome the bias of all the springs employed to bias the entrapment fingers.

In the operation of the apparatus just described, when reactor vessel 10 is open at the upper end thereof as shown in FIG. 1 and new O-rings are to be inserted, vessel protection pan 19 is initially lowered by cables 52 into vessel 10 to be supported by flange 14 as shown in FIG. 2. Then seal installment fixture 20, carrying O-rings 58 and 62 in the manner shown in FIG. 3b is lowered on pan 19 with the opening in hub 42 fitting over post 36, thereby insuring accurate alignment of O-rings 58 and 62 over grooves 24 and 26 designed to accommodate these seals. As fixture 20 comes to rest on the upper surface of flange 14, plunger 98 is raised thereby releasing and pushing O-rings 58 and 62 into grooves 24 and 26 designed to accommodate these seals. Fixture 20 and pan 19 are thereafter removed sequentially by raising their cables. When not in use, the cables would lie on the bottom of pan 19 or could be removed by the remotely operated apparatus (not shown) used in connection with the reactor.

Insertion of the seals have thus been accomplished with great accuracy, at a great saving as the apparatus is simple in construction and use, and with a minimum of danger of damage to the seals.

While only a preferred configuration has been described, it is understood that variations thereof are possible within the scope of this invention.

What is claimed is:

1. Apparatus for the placement of a seal into a previously prepared location on the surface of a member comprising:
    a. movable fixture means having a receptacle to accommodate said seal;
    b. pivoted means in said receptacle rotatable between a first position retaining said seal within said receptacle and a second position pushing said seal out of said receptacle;
    c. means for moving said fixture means carrying said seal with said pivoted means in said first position into contact with said surface;
    d. means insuring alignment of said receptacle with said previously prepared location as said fixture moves into contact with said surface; and
    e. means responsive to the making of said contact for moving said pivoted means into said second position thereby causing said seal to move out of said receptacle into said previously prepared location.

2. The apparatus of claim 1 in which said pivoted means normally is biased into said first position, and said responsive means includes a plunger biased into a position extending from said fixture means so that as said fixture means approaches contact with said surface, said plunger is urged into a retracted position actuating said pivoted means into said second position.

3. The apparatus of claim 2 in which pivoted means is formed from a pair of right angled finger like elements pivoted at their juncture.

4. Apparatus for the remote placement of an O-ring seal into a groove located in the upper surface of the head flange of an open nuclear reactor vessel comprising:
    a. means extending within said vessel supported by said flange having guide means;
    b. movable fixture means annular in configuration corresponding to said flange for being lowered into contact with the upper surface of said flange;
    c. said fixture means forming an annular receptacle for alignment with said groove when said fixture means is lowered into place on said flange, said fixture means having further means for engaging said guide means to insure accurate alignment of said fixture means;
    d. a plurality of spaced pivoted means in said receptacle between a first position retaining said seal within said receptacle and a second position ejecting said seal out of said receptacle;
    e. means responsive to the making of contact between said fixture means and said surface as the former is being lowered for moving said pivoted means into their second position thereby causing said seal to move out of said receptacle into said groove.

5. The apparatus of claim 4 in which said pivoted means normally is biased into their first positions, and said responsive means include plungers biased into positions extending down from said fixture means into their second positions.

6. The apparatus of claim 5 in which said flange is provided with more than one groove and said fixture means is provided with matching grooves and pivoted means for the simultaneous emplacement of more than one seal.

* * * * *